(12) United States Patent
Miyagi

(10) Patent No.: US 7,099,043 B2
(45) Date of Patent: Aug. 29, 2006

(54) HALFTONE SCREENING METHOD AND STORAGE MEDIUM

(75) Inventor: Makoto Miyagi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1024 days.

(21) Appl. No.: 10/156,000

(22) Filed: May 29, 2002

(65) Prior Publication Data

US 2002/0191203 A1 Dec. 19, 2002

(30) Foreign Application Priority Data

| May 30, 2001 | (JP) | ............................. 2001-162682 |
| Jul. 31, 2001 | (JP) | ............................. 2001-232336 |

(51) Int. Cl.
*H04N 1/52* (2006.01)
*H04N 1/58* (2006.01)

(52) U.S. Cl. ...................... 358/1.9; 358/3.26; 358/533; 358/536

(58) Field of Classification Search ................ 358/1.9, 358/3.26, 533–536, 3.06, 3.2
See application file for complete search history.

(56) References Cited

U.S. PATENT DOCUMENTS

| 4,752,822 A | 6/1988 | Kawamura |
| 5,394,252 A | 2/1995 | Holladay et al. |
| 6,128,099 A | 10/2000 | Delabastita |

FOREIGN PATENT DOCUMENTS

| DE | 36 06 427 A1 | 8/1986 |
| JP | 07274015 A | 10/1995 |

*Primary Examiner*—Scott A. Rogers
(74) *Attorney, Agent, or Firm*—Oblon, Spivak, McClelland, Maier & Neustadt, P.C.

(57) ABSTRACT

A halftone screening method creates screens of a plurality of colors, where each of the screens is divided into a plurality of cells, and intentionally changes a dot position of certain colors within cells of the screens of the certain colors relative to a dot position of a reference color within a cell of the screen of the reference color, so as to suppress a color tone change caused by positional errors of the screens.

20 Claims, 11 Drawing Sheets

HALFTONE SCREENING METHOD AND STORAGE MEDIUM

BACKGROUND OF THE INVENTION

This application claims the benefit of Japanese Patent Applications No.2001-162682 filed May 30, 2001 and No.2001-232336 filed Jul. 31, 2001, in the Japanese Patent Office, the disclosures of which are hereby incorporated by reference.

1. Field of the Invention

The present invention generally relates to halftone screening methods and storage media, and more particularly to a halftone screening method which uses halftone cells of a rectangular lattice, and a computer-readable storage medium which stores a computer program for causing a computer to process image data according to such a halftone screening method.

2. Description of the Related Art

FIGS. 1A and 1B are diagrams for explaining a conventional scattered dot dither type halftone cell. In FIGS. 1A and 1B, a non-regular hexagonal halftone cell is created by cutting a pair of confronting corners of a square halftone cell into a pair of confronting sloping sides. Since the pair of confronting corners of the square halftone cell made up of 9×9=81 pixels are cut into the pair of confronting sloping sides, the non-regular hexagonal halftone cell is made up of 81−9=72 pixels. FIG. 1A shows a non-regular hexagonal halftone cell C for one color, namely, cyan, and shows a case where 3×3=9 pixels at the central portion are colored to represent a dot C1 having a gradation level "9" with respect to a maximum number "72" of gradation levels.

When centers of halftone dots of each of the colors are arranged at the same pixel position of the halftone screen in a color printer, even a slight error in the positions of the halftone dots of each of the colors on the halftone screen results in a conspicuous change in color tone. FIG. 1B shows a case where a non-regular-hexagonal halftone cell M for magenta is shifted by 1 pixel to the right and 1 pixel to the top with respect to the non-regular hexagonal halftone cell C for cyan, and a non-regular hexagonal halftone cell Y for yellow is shifted by 2 pixels to the right and 1 pixel to the bottom with respect to the non-regular hexagonal halftone cell C for cyan. In this case, even if the 3×3=9 pixels at the central portion of the non-regular hexagonal halftone cell M is colored to represent a dot M1, the 3×3=9 pixels at the central portion of the non-regular hexagonal halftone cell Y is colored to represent a dot Y1, and the dots C1, M1 and Y1 are overlapped, the positions of the dots C1, M1 and Y1 do not match and the change in the color tone is conspicuous.

SUMMARY OF THE INVENTION

Accordingly, it is a general object of the present invention to provide a novel and useful halftone screening method and computer-readable storage medium, in which the problems described above are eliminated.

Another and more specific object of the present invention is to provide a halftone screening method and a computer-readable storage medium, which can reduce the color irregularities-caused by positional errors of halftone cells of each of the colors.

Still another object of the present invention is to provide a halftone screening method comprising the steps of (a) creating screens of a plurality of colors, each of the screens being divided into a plurality of cells; and (b) intentionally changing a dot position of certain colors within cells of the screens of the certain colors relative to a dot position of a reference color within a cell of the screen of the reference color, so as to suppress a color tone change caused by positional errors of the screens. According to the halftone screening method of the present invention, it is possible to reduce the color irregularities caused by positional errors of halftone cells of each of the colors.

The step (b) may shift the cells of the screens of the certain colors relative to the cells of the screen of the reference color. Alternatively, the step (b) may rotate or turn the cells of the screens of the certain colors relative to the cells of the screen of the reference color.

The halftone screening method may further comprise the step of (c) detecting whether an input image is a clustered dot image or a scattered dot image where the step (b) shifts the cells of the screens of the certain colors relative to the cells of the screen of the reference color when the step (c) detects the clustered dot image, and rotates or turns the cells of the screens of the certain colors relative to the cells of the screen of the reference color when the step (c) detects the scattered dot image.

A further object of the present invention is to provide a computer-readable storage medium which stores a program for causing a computer to process image data by a halftone screening method, where the program comprises a first procedure which causes the computer to create screens of a plurality of colors, each of the screens being divided into a plurality of cells; and a second procedure which causes the computer to intentionally change a dot position of certain colors within cells of the screens of the certain colors relative to a dot position of a reference color within a cell of the screen of the reference color, so as to suppress a color tone-change caused by positional errors of the screens. According to the computer-readable storage medium of the present invention, it is possible to reduce the color irregularities caused by positional errors of halftone cells of each of the colors.

The second procedure may cause the computer to shift the cells of the screens of the certain colors relative to the cells of the screen of the reference color. Alternatively, the second procedure causes the computer to rotate or turn the cells of the screens of the certain colors relative to the cells of the screen of the reference color.

The program may further comprise a third procedure which causes the computer to detect whether an input image is a clustered dot image or a scattered dot image, where the second procedure causes the computer to shift the cells of the screens of the certain colors relative to the cells of the screen of the reference color when the third procedure detects the clustered dot image, and rotate or turn the cells of the screens of the certain colors relative to the cells of the screen of the reference color when the third procedure detects the scattered dot image.

Other objects and further features of the present invention will be apparent from the following detailed description when read in conjunction with the accompanying drawings.

DESCRIPTION OF THE PREFERRED EMBODIMENTS

A description will be given of embodiments of a halftone screening method according to the present invention and a computer-readable storage medium according to the present invention, by referring to FIG. 2 and the subsequent drawings.

First, a description will be given of a first embodiment of the halftone screening method according to the present invention, by referring to FIGS. 2 and 3. FIG. 2 is a diagram for explaining the first embodiment of the halftone screening method, and FIG. 3 is a diagram for explaining an arrangement of a black screen in the first embodiment of the halftone screening method.

In order to prevent color irregularities from being generated due to positional errors of screens of each of the colors, this first embodiment arranges the center of the halftone dot of each color away as much as possible from the dot center of other colors. In this first embodiment, the cells used each have a non-regular hexagonal shape. The cell of a certain color is used as a reference in determining the centers of the cells of the other colors. For example, in the case shown in FIG. 2, a cyan cell C is used as the reference, and a center of a magenta cell M and a center of a yellow cell Y are arranged at mutually confronting right-angled corners of the reference cyan cell C. As a result, it is possible to reduce the color irregularity caused by the positional errors of the cyan, magenta and yellow screens.

Figure 1A:
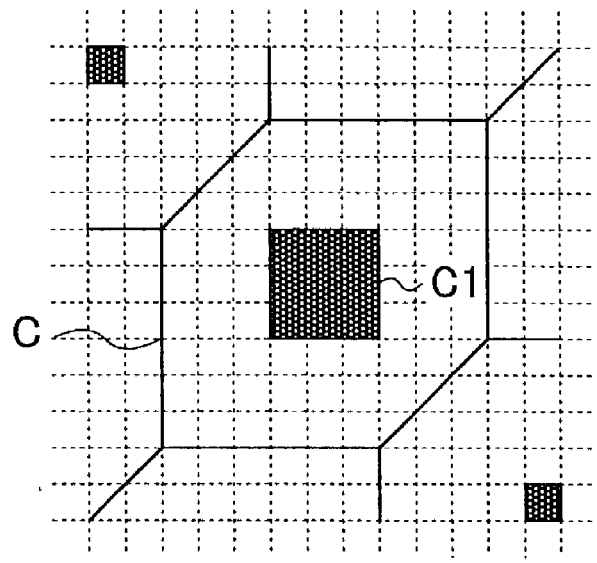
FIGS. 1A and 1B are diagrams for explaining a conventional scattered dot dither type halftone cell.
Figure 1B:
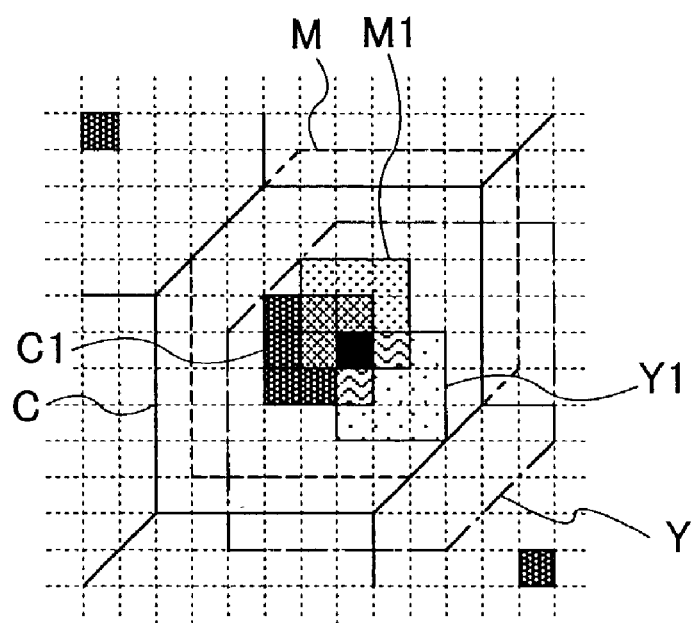
Figure 2:
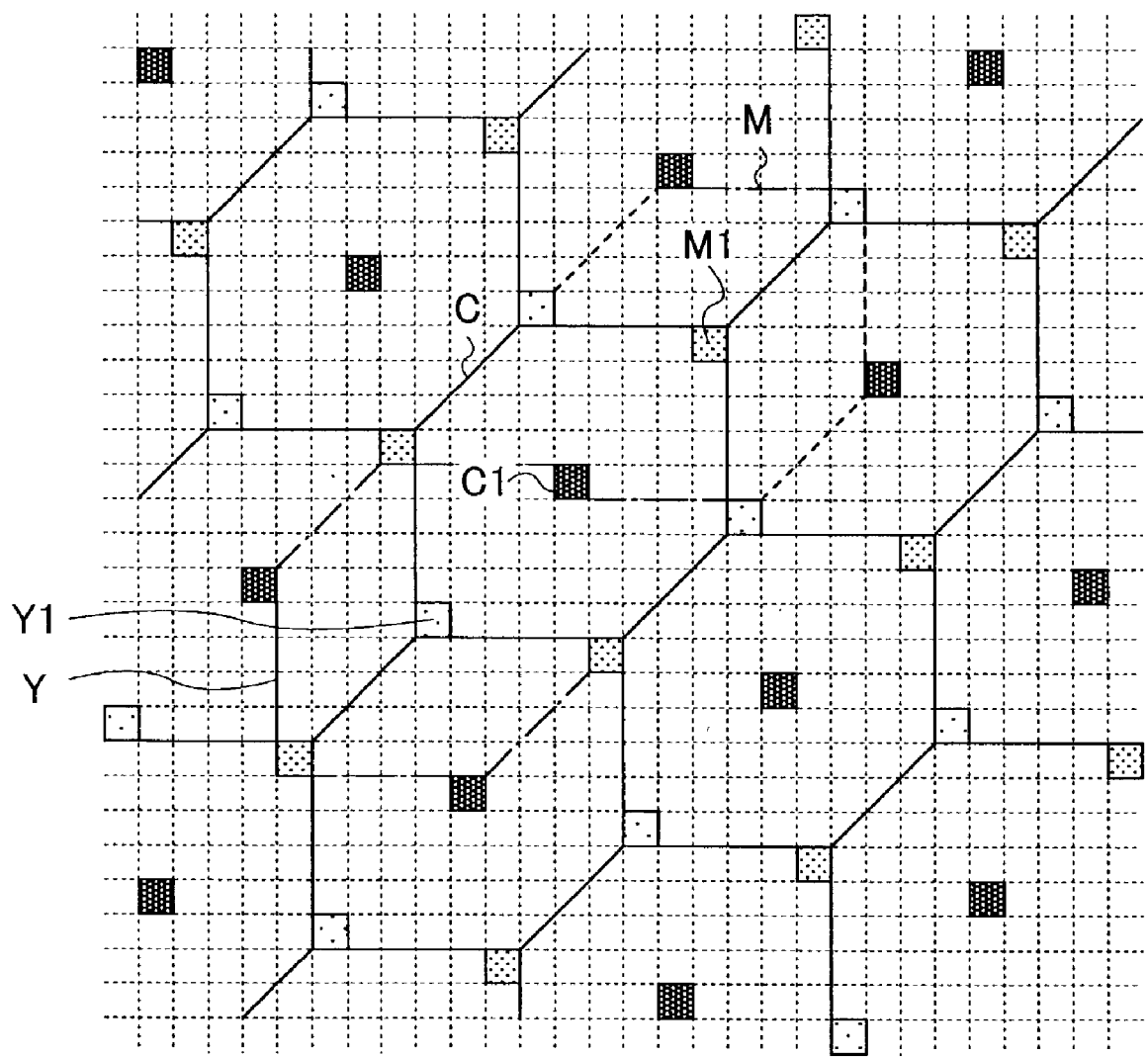
FIG. 2 is a diagram for explaining a first embodiment of the halftone screening method according to the present invention.

In FIG. 2, each of the cyan, magenta and yellow cells C, M and Y is made up of 81−9=72 pixels, and cyan, magenta and yellow dots C1, M1 and Y1 are respectively made up of 3×3=9 pixels in the corresponding cyan, magenta and yellow cells C, M and Y. When the cyan, magenta and yellow cells C, M and Y are overlapped in a normal manner without positional errors, these cyan, magenta and yellow dots C1, M1 and Y1 will not overlap. In addition, even if the magenta and yellow cells M and Y have positional errors amounting to 1 pixel with respect to the reference cyan cell C, the cyan, magenta and yellow dots C1, M1 and Y1 will not overlap. As the number of gradation levels increases, the cyan, magenta and yellow dots C1, M1 and Y1 will overlap regardless of the positional errors of the cyan, magenta and yellow cells C, M and Y, but the number of overlapping pixels will be small in relation to the number of pixels forming each cell, thereby making a change in the color tone extremely small and negligible from the practical point of view.

Figure 3:
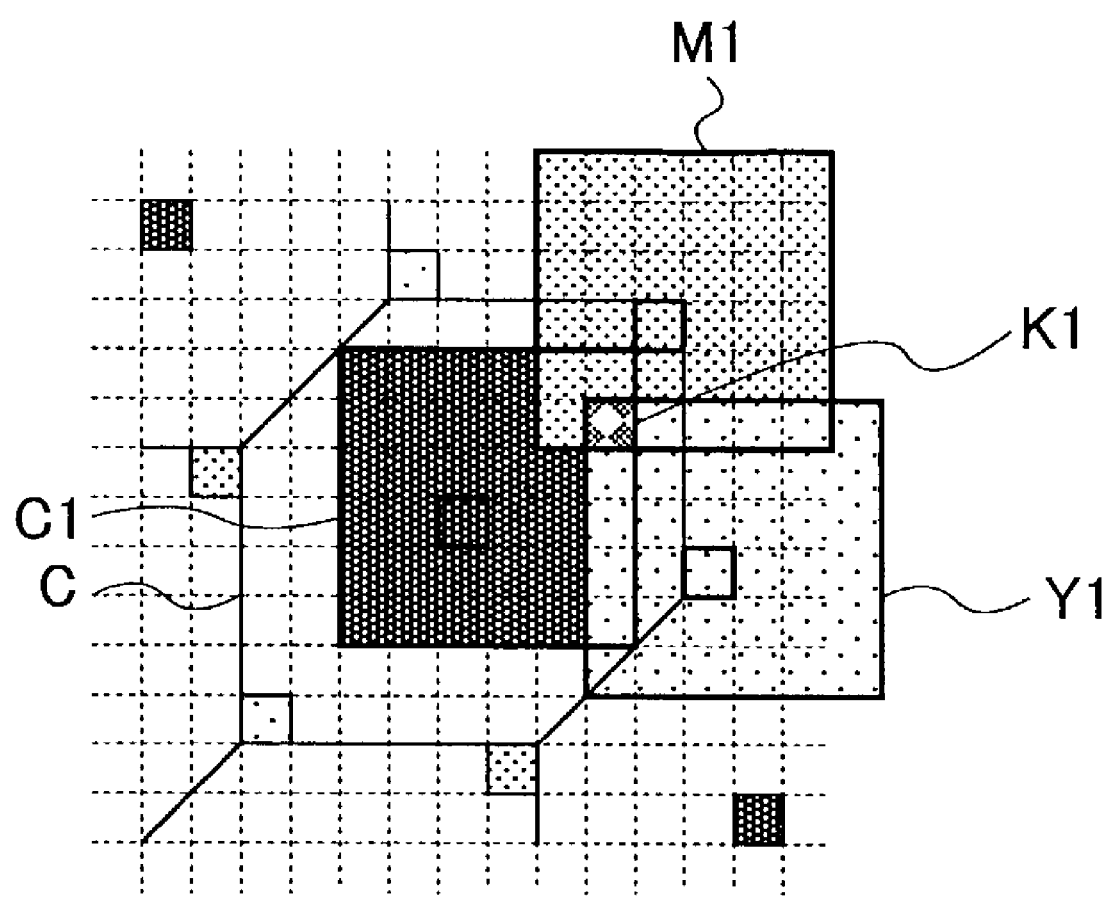
FIG. 3 is a diagram for explaining an arrangement of a black screen in the first embodiment of the halftone screening method.

The black screen may be arranged as shown in FIG. 3. In FIG. 3, K1 denotes a black dot. When the tones of the cyan, magenta and yellow dots C, M and Y are increased and respectively indicate the same tone, the cyan, magenta and yellow dots C1, M1 and Y1 overlap in an overlapping portion at a certain tone. The center of the black cell K is set to a pixel position within this overlapping portion, and the size of the black dot K1 is increased proportionally to the tone thereof. In the case shown in FIG. 3, the center of the black cell, that is, the black dot K1, is set to the position of the single pixel position where the cyan, magenta and yellow dots C1, M1 and Y1 overlap.

In addition, in a case where a black generation and under color removal (BG/UCR) is performed and the cyan, magenta and yellow dots C1, M1 and Y1 overlap at a pixel position, only the black dot K1 is drawn and the cyan, magenta and yellow dots C1, M1 and Y1 are not drawn.

A first embodiment of the computer-readable storage medium stores a computer program for causing a computer to process image data according to the first embodiment of the halftone screening method. The program may be read from a recording medium which forms the computer-readable storage medium and is loaded into the computer or, downloaded from a recording medium of another computer via a communication means such as the Internet.

The program includes a procedure which causes the computer to arrange the center of the halftone dot of each color away as much as possible from the dot center of other colors. This procedure includes at least one of the following steps or procedures.

Step S1: Using a reference color cell, such as the non-regular hexagonal reference cyan cell C, centers of the other cells which are the magenta cell M and the yellow cell Y in this case are arranged at mutually confronting right-angled corners of the reference cyan cell C.

Step S2: When the tones of the cyan, magenta and yellow dots C1, M1 and Y1 are increased and respectively indicate the same tone, and the cyan, magenta and yellow dots C1, M1 and Y1 overlap in an overlapping portion at a certain tone, the center of the black cell K is set to a pixel position within this overlapping portion.

Step S3: When a background removal such as BG/UCR is performed and the cyan, magenta and yellow dots C1, M1 and Y1 overlap at a pixel position, only the black dot K1 is drawn and the cyan, magenta and yellow dots C1, M1 and Y1 are not drawn.

Figure 4:
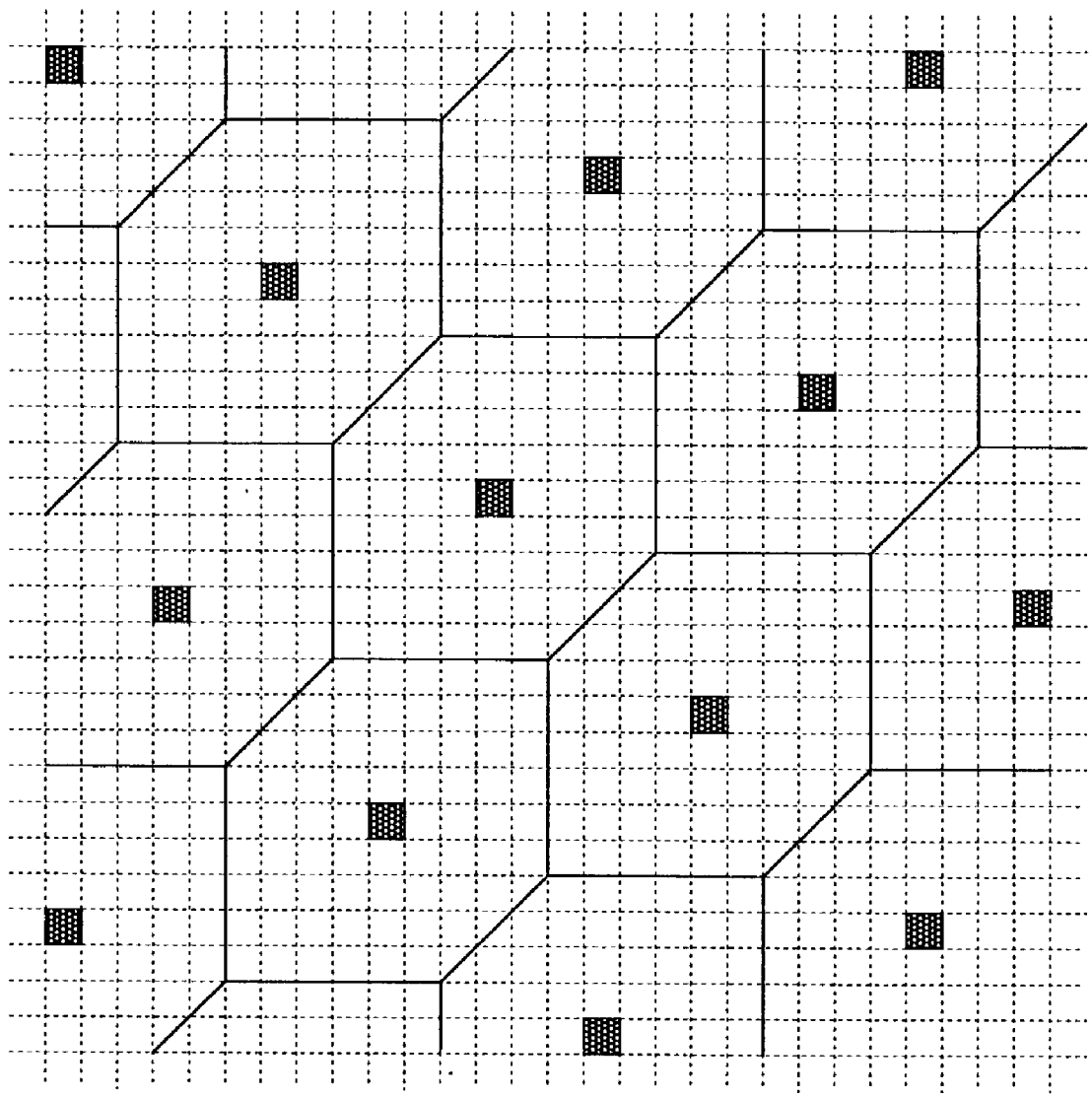
FIG. 4 is a diagram showing reference non-regular hexagonal cells used in a second embodiment of the halftone screening method according to the present invention.
Figure 5A:
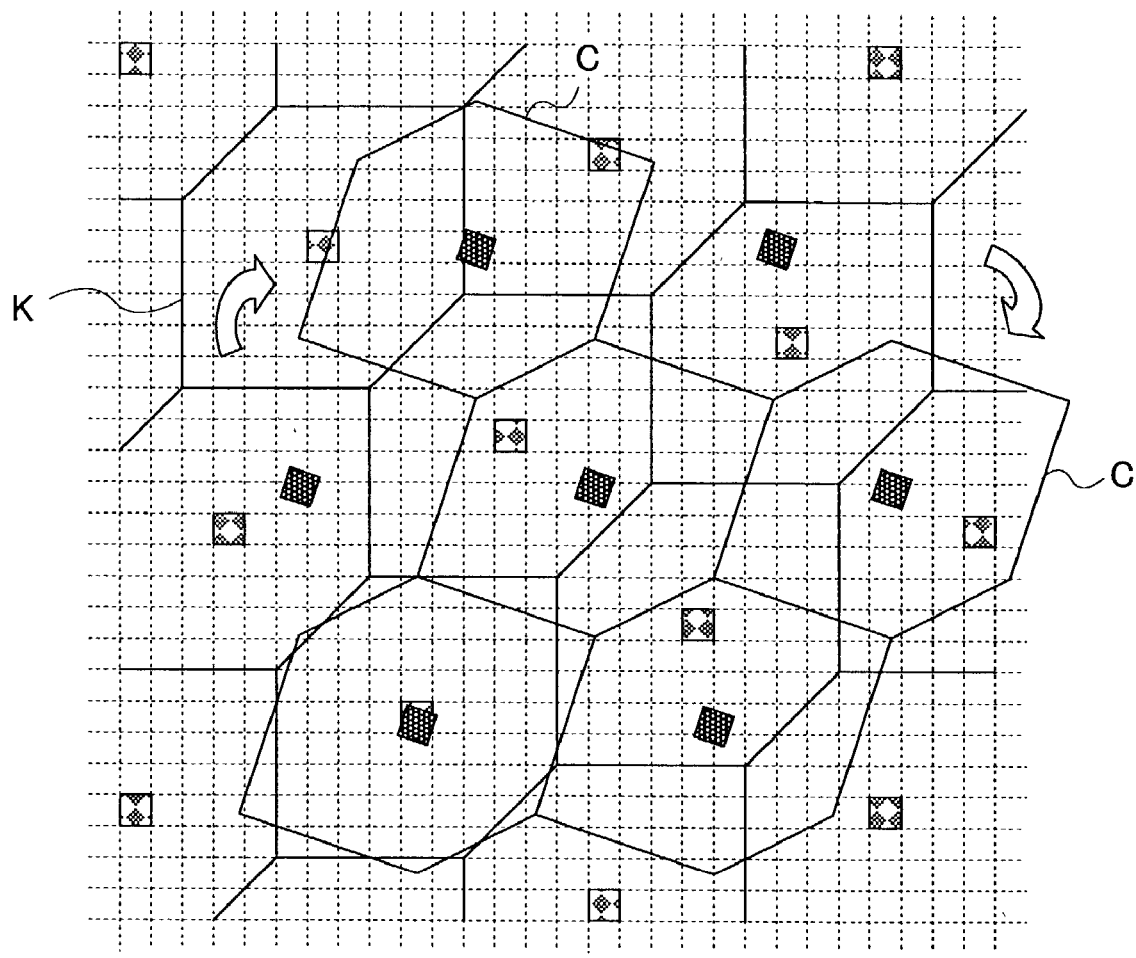
FIGS. 5A and 5B are diagrams for explaining screen angles in the second embodiment of the halftone screening method.
Figure 5B:
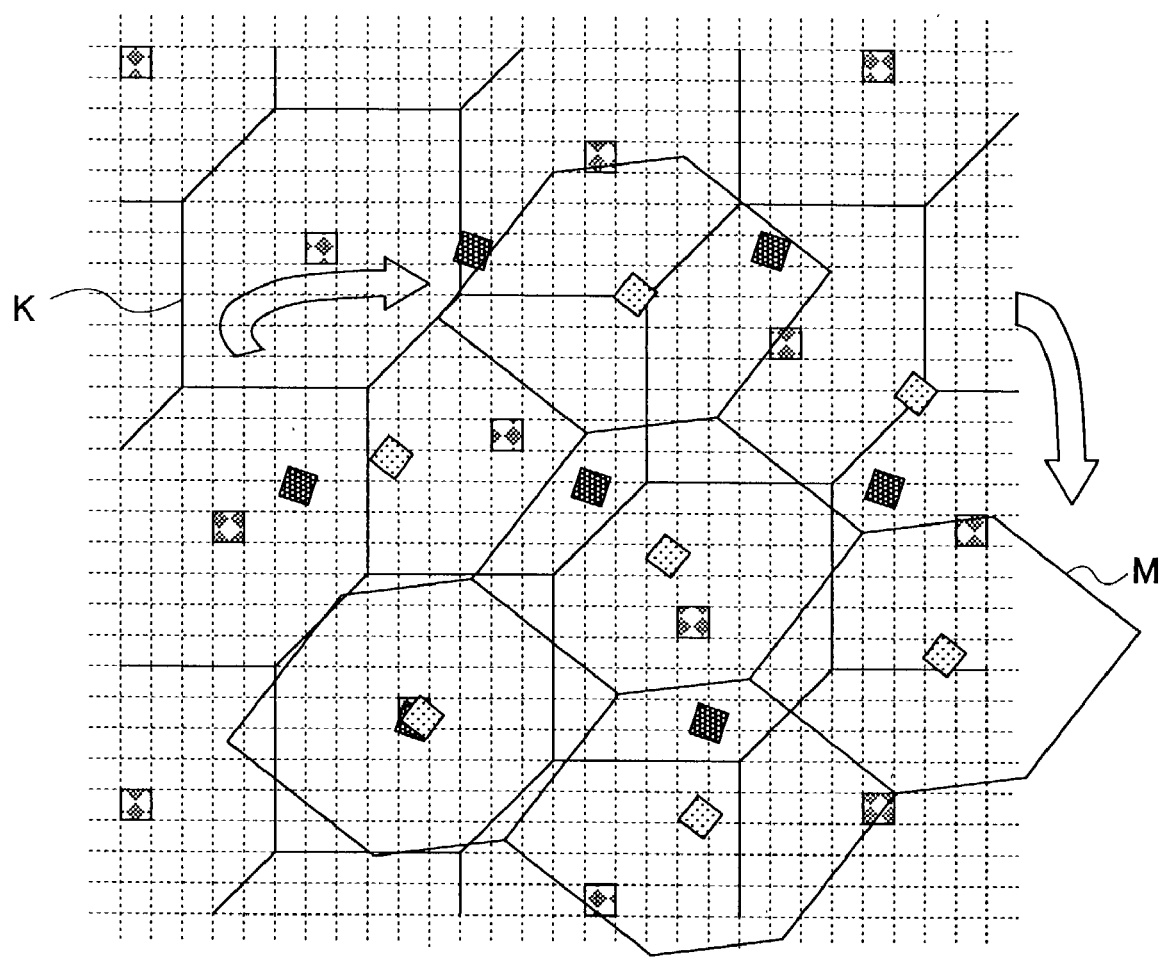

Next, a description will be given of a second embodiment of the halftone screening method according to the present invention, by referring to FIGS. 4 through 6. FIG. 4 is a diagram showing reference non-regular hexagonal cells used in the second embodiment of the halftone screening method. FIGS. 5A and 5B are diagrams for explaining screen angles in the second embodiment of the halftone screening method. Further, FIG. 6 is a diagram for explaining center dots of black, cyan and magenta screens in the second embodiment of the halftone screening method.

When centers of the halftone dots of each of the colors are arranged at the same pixel position of the halftone screen in a color printer, even a slight error in the positions of the halftone dots of each of the colors on the halftone screen results in a conspicuous change in color tone, thereby generating color irregularities. For example, a Japanese Laid-Open Patent Application No.7-274015 proposes a digital halftone screening method using square cells, wherein the color irregularities caused by the positioning error of the color screens is suppressed by reproducing the color screens by setting printing angles. The printing angle is set to 15 degrees for the cyan screen, 75 degrees for the magenta screen, 0 degree for the yellow screen, and 45 degrees for the black screen. The dot image is least conspicuous to the human eyes when the printing angle is 45 degrees, and thus, the printing angle is normally set to 45 degrees for the black screen or, for the magenta screen when placing importance on the reproducibility of skin color.

On the other hand, the second embodiment of the halftone screening method uses non-regular hexagonal halftone cells, similar to the first embodiment of the halftone screening method. The non-regular hexagonal halftone cell is created by cutting a pair of confronting corners of a square halftone cell into a pair of confronting sloping sides. Accordingly, the centers of the non-regular hexagonal halftone cells are arranged in a 45-degree direction (or −45-degree direction), along the sloping sides of the non-regular hexagonal halftone cells, as shown in FIG. 4. The black screen (or the magenta screen) is regarded as the reference color screen, and the screens of other colors are rotated by an angle (or turned) and positioned with respect to the reference color screen, as shown in FIGS. 5A and 5B. FIG. 5A shows the cyan screen which is rotated relative to the reference black screen, and FIG. 5B shows the magenta screen which is further rotated with respect to the cyan screen relative to the reference black screen. When rotating the color screen, two mutually adjacent color dots which are adjacent to a color dot which becomes the center of rotation of the color screen are selected, and the other color screens are rotated so that the color dots of each of the other color screens becomes arranged between the two mutually adjacent color dots.

Figure 6:
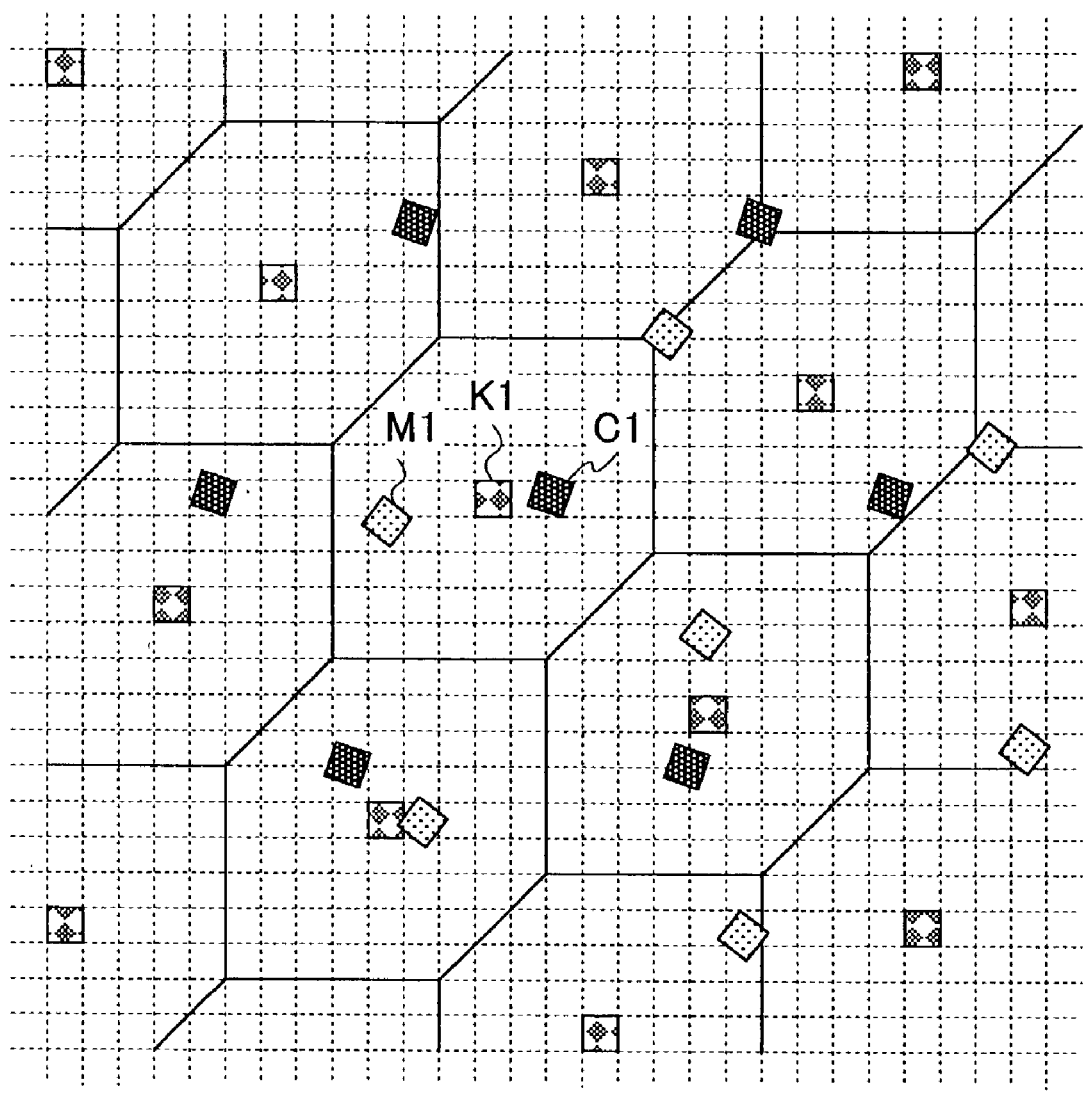
FIG. 6 is a diagram for explaining center dots of black, cyan and magenta screens in the second embodiment of the halftone screening method.

According to the black, cyan and magenta screens shown in FIGS. 5A and 5B, the intervals of the black dot K1, the cyan dot C1 and the magenta dot M1 are non-uniform as shown in FIG. 6. Accordingly, even if errors are generated in the dot positions due to mechanical vibration or the like in the color printer, a dot error at one portion will be mutually cancelled by a dot error at another portion. For this reason, the errors in the dot positions do not greatly affect the change in the color tone, and the color irregularities can be suppressed. Since artificial patterns are less conspicuous to the human eyes for the yellow screen, and the positional error of the yellow screen does not greatly affect the change in the color tone, it is possible to use square yellow cells and a 0 degree printing angle for the yellow screen.

A second embodiment of the computer-readable storage medium stores a computer program for causing a computer to process image data according to the second embodiment of the halftone screening method. The program may be read from a recording medium which forms the computer-readable storage medium and is loaded into the computer or, downloaded from a recording medium of another computer via a communication means such as the Internet.

The program includes a procedure which causes the computer to rotate color screens relative to a reference color screen. This procedure includes the following steps or procedures.

Step SS1: Using a reference color cell, such as the non-regular hexagonal reference cell, centers of the cells of other colors are arranged at mutually confronting right-angled corners of the reference cell.

Step SS2: The screens of the other colors are rotated-relative to the screen of the reference color. For example, when rotating the color screen, two mutually adjacent color dots which are adjacent to a color dot which becomes the center of rotation of the color screen are selected, and the other color screens are rotated so that the color dot of each of the other color screens becomes arranged between the two mutually adjacent color dots.

Step SS3: The black or magenta screen may be used as the reference color screen, and the yellow screen may or may not be rotated.

Figure 7:
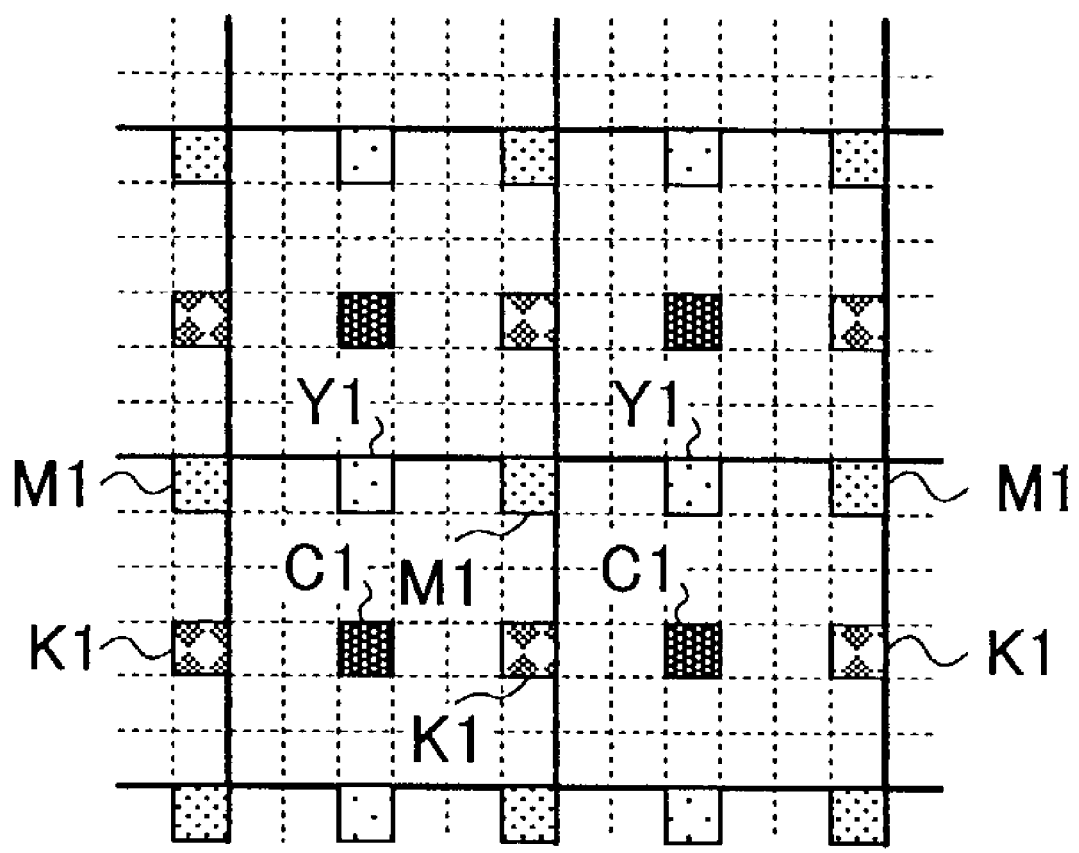
FIG. 7 is a diagram showing square cells used in the third embodiment of the halftone screening method.

Next, a description will be given of a third embodiment of the halftone screening method according to the present invention, by referring to FIG. 7. FIG. 7 is a diagram showing square cells used in the third embodiment of the halftone screening method.

In the third embodiment, the square cells each made up of 6×6=36 pixels are used as shown in FIG. 7. For the sake of convenience, the cyan square cells are indicated by bold lines in FIG. 7. In FIG. 7, the center magenta dot M1 of the magenta cell of the magenta screen is arranged at one corner of the square cyan cell of the cyan screen. The center yellow dot Y1 of the yellow cell of the yellow screen is arranged between the center magenta dots M1 of two mutually adjacent magenta cells. The center black dot K1 of the black cell of the black screen is arranged between the center cyan dots C1 of two mutually adjacent cyan cells.

Therefore, the embodiments of the halftone screening method and computer-readable storage medium intentionally change the dot position of certain colors within cells of the certain colors relative to the dot position of a reference color within a cell of the reference color, so as to suppress the color tone change and color irregularities caused by positional errors of the color screens. This may be achieved by shifting the cells of the certain colors relative to the cells of the reference color or, by rotating or turning the cells of the certain colors relative to the cells of the reference color.

Figure 8:
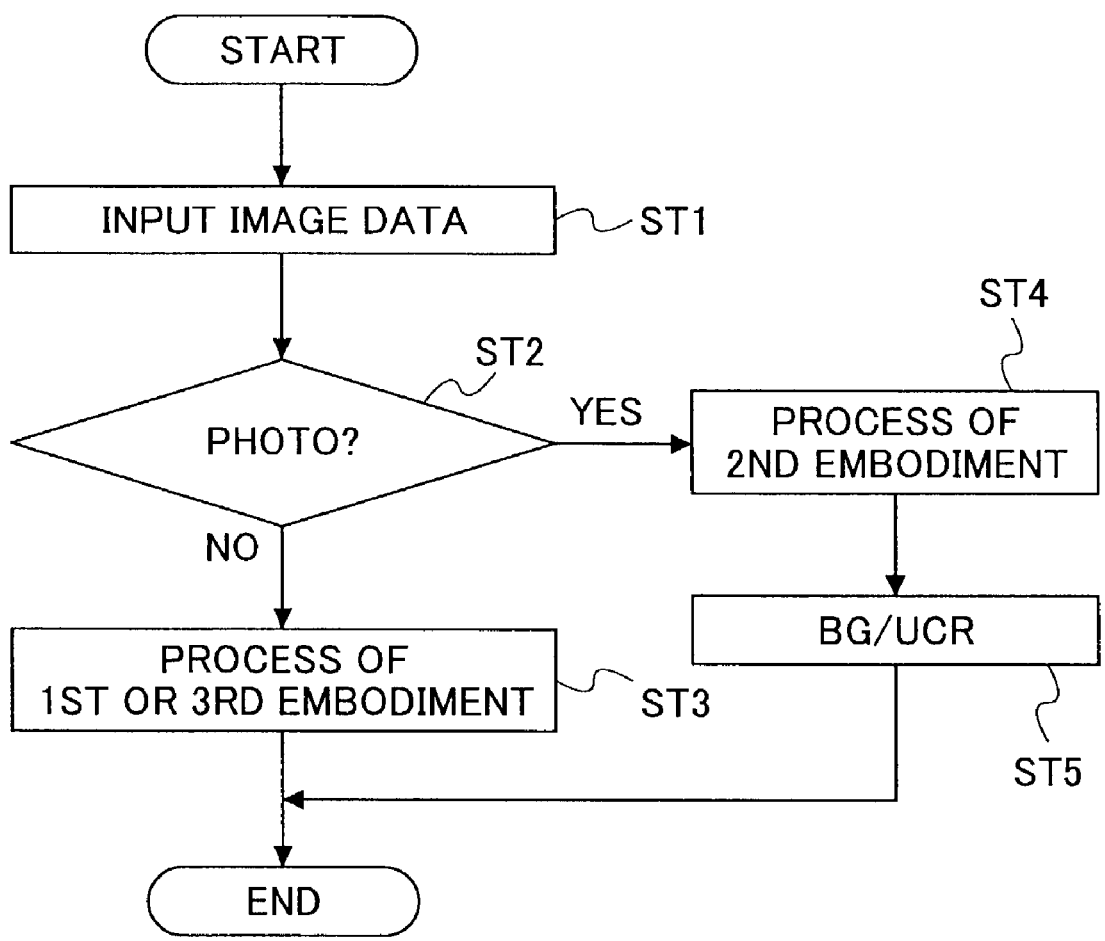
FIG. 8 is a flow chart for explaining a fourth embodiment of the halftone screening method according to the present invention.

FIG. 8 is a flow chart for explaining a fourth embodiment of the halftone screening method according to the present invention. The process shown in FIG. 8 corresponds to a process a computer is caused to carry out by a program which is stored in a fourth embodiment of the computer-readable storage medium according to the present invention.

In FIG. 8, a step ST1 inputs an 8-bit image data, for example. A step ST2 decides whether the input image data, that is, the object, relates to a photograph. If the input image data is characters (document) and the decision result in the step ST2 is NO, a step ST3 carries out the process of the first or third embodiment described above and shifts the positions of the color cells, and carries out a dither process to output a 1-bit image data by applying the scattered dot (dither) image, and the process ends. In the case of the scattered dot (dither) image, the color reproducibility is improved if the overlap of the cells of different colors is small, when taking into consideration the generation of black by overlapping cyan, magenta and yellow.

On the other hand, if the input image data is a photograph and the decision result in the step ST2 is YES, a step ST4 carries out the process of the second embodiment described above and rotates or turns the color cells relative to the reference color cells, and carries out a dither process to output a 1-bit image data by applying the clustered dot (dither) image. A step ST5 performs a black generation and under color removal (BG/UCR) with respect to the 1-bit image data output by the step ST4, and the process ends. In the case of the clustered dot (dither) image, the color reproducibility deteriorates if no screen rotation is made and the screen positions of two colors match. Hence, it is desirable to rotate all color screens with respect to the reference color screen. However, the yellow screen does not have a large effect to the human eyes compared to the other colors, and thus, it is possible to simply shift the position of the yellow screen instead of rotating, while the screens of the other colors are rotated relative to the reference color screen.

Figure 9:
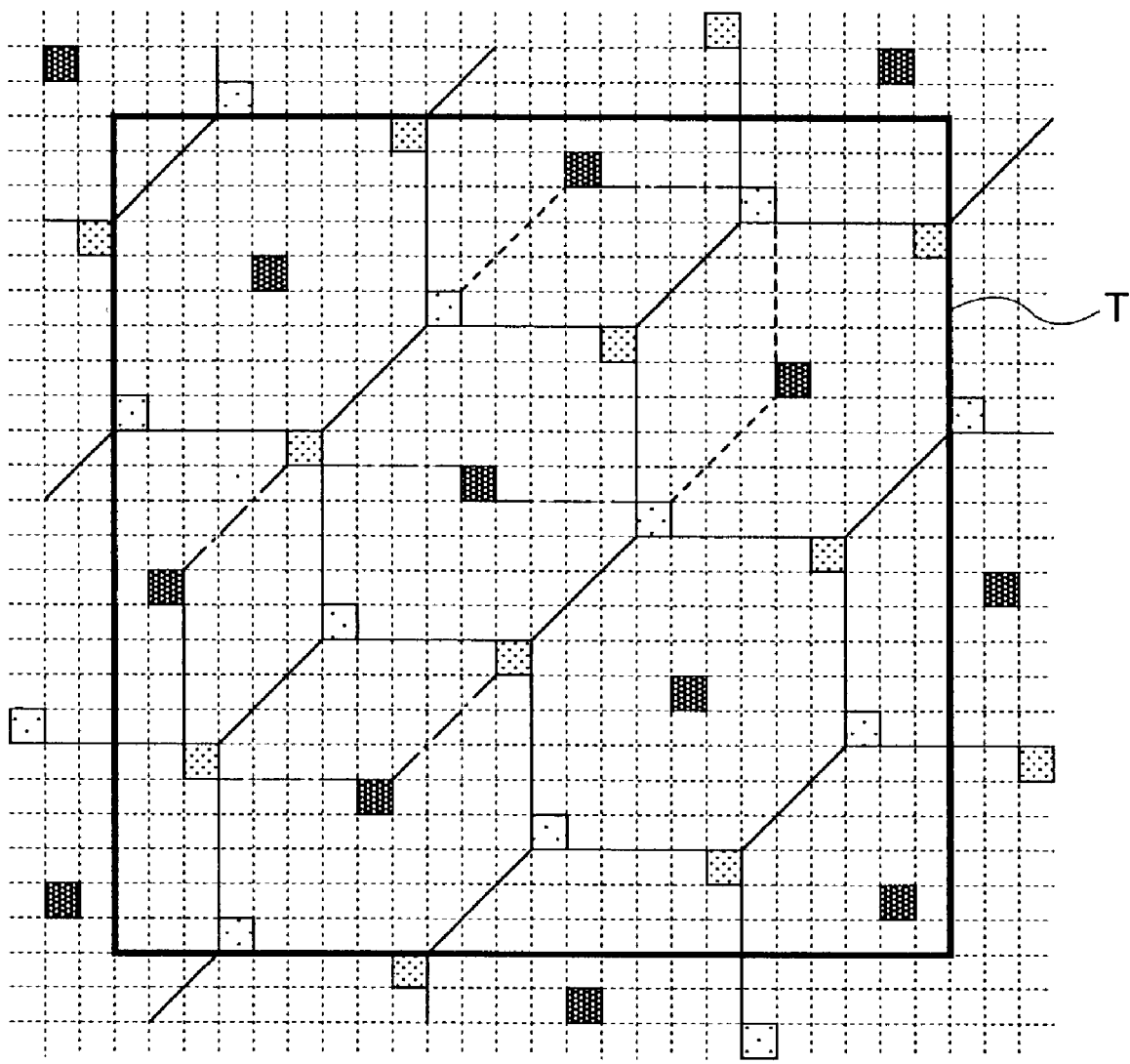
FIG. 9 is a diagram for explaining tiles.

FIG. 9 is a diagram for explaining tiles. In FIG. 9, those parts which are the same as those corresponding parts in FIG. 2 are designated by the same reference numerals, and a description thereof will be omitted.

Generally, when using the halftone screening method, tiles are used. Each tile is made up of a plurality of cells. In FIG. 9, one tile T is indicated by a bold line. The tiles are made up of a collection of cells, so that the halftone becomes continues at the tile boundary, as shown in FIG. 9. If the tiles are arranged to cover the screen (image drawing region) starting from an origin, a coordinate on the screen can be converted into a coordinate within each tile, based on a remainder which is obtained by dividing the image drawing coordinate by the size of the tile. By using such tiles which are known, it becomes unnecessary to carry out an exception process at edges of the screen.

Figure 10:
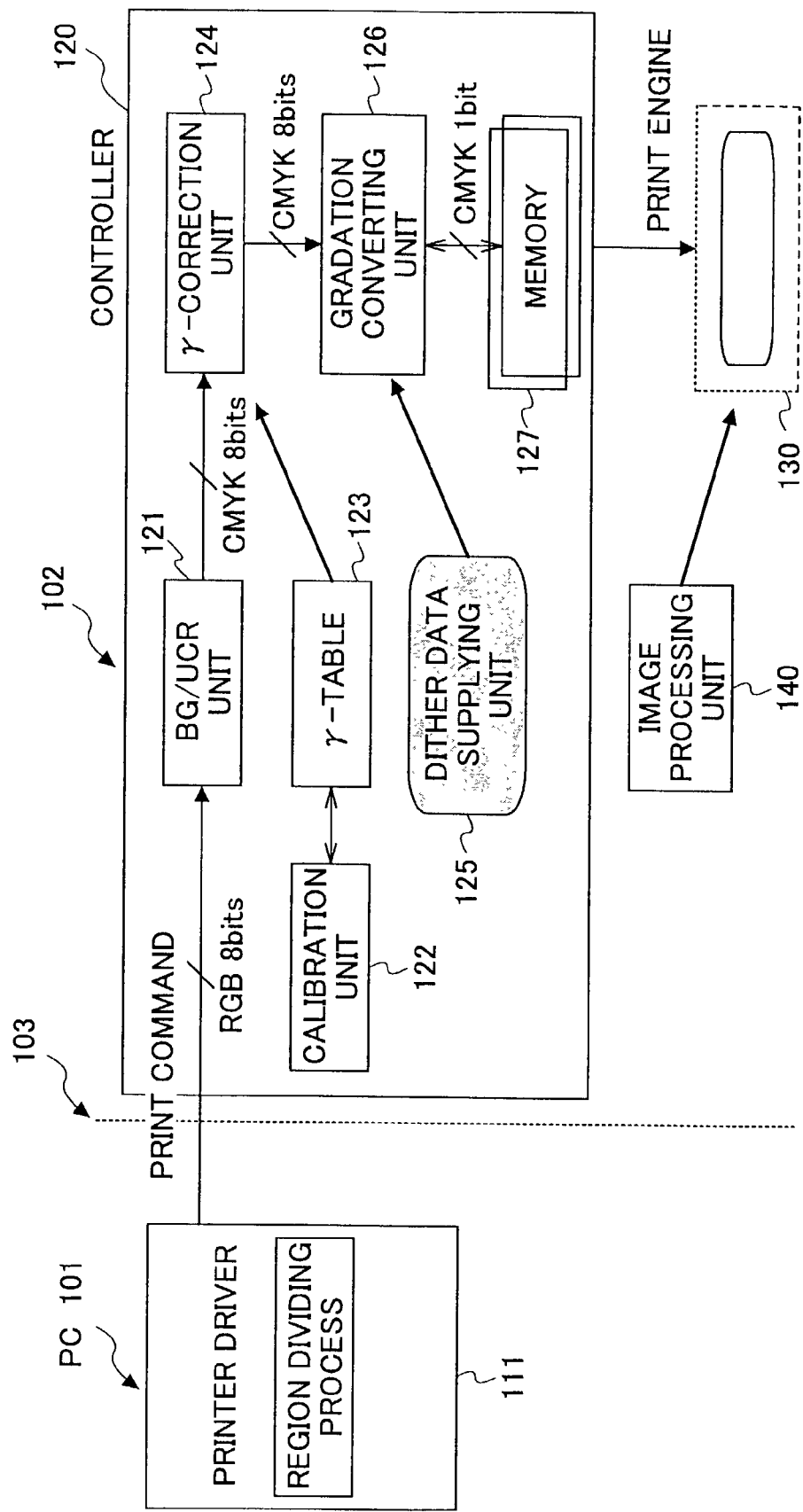
FIG. 10 is a system block diagram showing a printing system employing the present invention.

FIG. 10 is a system block diagram showing a printing system employing the present invention. The printing system shown in FIG. 10 includes a personal computer (PC) 101 which functions as a host unit, and a printer 102 which is connected to the personal computer 101 via a host interface (I/F) 103.

The personal computer 101 includes a known printer driver 111 which carries out a known region dividing process for dividing image data of an image into image data of each of image regions within the image. The printer driver 111 supplies a print command and the image data to the BG/UCR unit 121 within the controller of the printer 102. For example, the image data supplied from the printer driver 111 to the BG/UCR unit 121 is an 8-bit RGB data.

The printer 102 includes a controller 120, a known print engine 130, and a known image processing unit 140. The controller 120 controls the print engine 130 to print image data. The image processing unit 140 carries out an edge emphasis, a smoothing and the like with respect to the image data to be printed. The image processing unit 140 may be provided within the controller 120.

The controller 120 includes the BG/UCR unit 121, a calibration unit 122, a gamma-correction table 123, a gamma-correction unit 124, a dither data supplying unit 125, a gradation converting unit 126, and a memory 127. The BG/UCR unit 121 performs the BG/UCR with respect to the 8-bit RGB (red, green, blue) data received from the printer driver 111, and supplies an 8-bit CMYK (cyan, magenta, yellow, black) data to the gamma-correction unit 124. The gamma-correction unit 124 carries out a known gamma-correction based on data received from the gamma-table 123 under control of the calibration unit 122, and supplies an 8-bit gamma-corrected CMYK data to the gradation conversion unit 126. The gradation conversion unit 126 carries out a gradation conversion based on dither data received from the dither data supplying unit 125, and output a 1-bit CMYK data which is stored in the memory 127. The basic structure of the controller 120 is known, except that the dither data supplying unit 125 supplies the dither data which has been subjected to the halftone screening process of the present invention.

The image processing unit 140 carries out an image processing, such as the edge emphasis and the smoothing, with respect to the 1-bit CMYK data read from the memory 127 and to be printed by the print engine 130.

In the case shown in FIG. 10, the dither data supplying unit 125 is provided within the controller 120, and may be realized by a memory which prestores the dither data which has been subjected to the halftone screening process of the present invention. The dither data to be stored in this memory may be calculated by the printing system, such as the personal computer 101 or a processor (not shown) which is provided within the controller 120 or is externally connected to the controller 120. Alternatively, the dither data to be stored in this memory may be calculated by the manufacturer of the printing system, and prestored in this memory.

Further, the present invention is not limited to these embodiments, but various variations and modifications may be made without departing from the scope of the present invention.

What is claimed is:

1. A halftone screening method comprising the steps of:
   (a) creating screens of a plurality of colors, each of the screens being divided into a plurality of cells; and
   (b) intentionally changing a dot position of certain colors within cells of the screens of the certain colors relative to a dot position of a reference color within a cell of the screen of the reference color, so as to suppress a color tone change caused by positional errors of the screens.

2. The halftone screening method as claimed in claim 1, wherein said step (b) shifts the cells of the screens of the certain colors relative to the cells of the screen of the reference color.

3. The halftone screening method as claimed in claim 2, wherein each of the cells has a non-regular hexagonal shape with two mutually confronting right-angled corners, and centers of the cells of the screens of two certain colors are respectively arranged at the two mutually confronting right-angled corners of the cell of the screen of the reference color.

4. The halftone screening method as claimed in claim 2, wherein each of the cells has a non-regular hexagonal shape, and a center of the cell of a black screen is arranged at a position where a cyan dot in the cell of a cyan screen, a magenta dot in the cell of the magenta screen and a yellow dot in the cell of the yellow screen overlap as tones of the cyan dot, the magenta dot and the yellow dot are increased and respectively indicate the same tone.

5. The halftone screening method as claimed in claim 4, further comprising the step of:
   (c) only the black dot is drawn and the cyan dot, the magenta dot and the yellow dot are not drawn in a case where a black generation and under color removal (BG/UCR) is performed and the cyan dot, the magenta dot and the yellow dot overlap at a pixel position.

6. The halftone screening method as claimed in claim 2, wherein each of the cells has a square shape, and a center dot of the cell of a first color screen is arranged at one corner of the cell of a second color screen, a center dot Y1 of a third color screen is arranged between the center dots of two mutually adjacent cells of the first color screen, and a center dot of the cell of a fourth color screen is arranged between the center dots of two mutually adjacent cells of the second color screen.

7. The halftone screening method as claimed in claim 1, wherein said step (b) rotates or turns the cells of the screens of the certain colors relative to the cells of the screen of the reference color.

8. The halftone screening method as claimed in claim 7, wherein each of the cells has a non-regular hexagonal shape with two mutually confronting right-angled corners.

9. The halftone screening method as claimed in claim 7, wherein the reference color is black or magenta.

10. The halftone screening method as claimed in claim 1, further comprising the step of:
(c) detecting whether an input image is a photograph or characters,
said step (b) shifting the cells of the screens of the certain colors relative to the cells of the screen of the reference color when said step (c) detects the characters by applying a scattered dot image, and rotating or turning the cells of the screens of the certain colors relative to the cells of the screen of the reference color when said step (c) detects the photograph by applying a clustered dot image.

11. A computer-readable storage medium which stores a program for causing a computer to process image data by a halftone screening method, said program comprising:
a first procedure which causes the computer to create screens of a plurality of colors, each of the screens being divided into a plurality of cells; and
a second procedure which causes the computer to intentionally change a dot position of certain colors within cells of the screens of the certain colors relative to a dot position of a reference color within a cell of the screen of the reference color, so as to suppress a color tone change caused by positional errors of the screens.

12. The computer-readable storage medium as claimed in claim 11, wherein said second procedure causes the computer to shift the cells of the screens of the certain colors relative to the cells of the screen of the reference color.

13. The computer-readable storage medium as claimed in claim 12, wherein each of the cells has a non-regular hexagonal shape with two mutually confronting right-angled corners, and centers of the cells of the screens of two certain colors are respectively arranged at the two mutually confronting right-angled corners of the cell of the screen of the reference color.

14. The computer-readable storage medium as claimed in claim 12, wherein each of the cells has a non-regular hexagonal shape, and a center of the cell of a black screen is arranged at a position where a cyan dot in the cell of a cyan screen, a magenta dot in the cell of the magenta screen and a yellow dot in the cell of the yellow screen overlap as tones of the cyan dot, the magenta dot and the yellow dot are increased and respectively indicate the same tone.

15. The computer-readable storage medium as claimed in claim 14, further comprising:
a third procedure which causes the computer to draw only the black dot and not draw the cyan dot, the magenta dot and the yellow dot in a case where a black generation and under color removal (BG/UCR) is performed and the cyan dot, the magenta dot and the yellow dot overlap at a pixel position.

16. The computer-readable storage medium as claimed in claim 12, wherein each of the cells has a square shape, and a center dot of the cell of a first color screen is arranged at one corner of the cell of a second color screen, a center dot Y1 of a third color screen is arranged between the center dots of two mutually adjacent cells of the first color screen, and a center dot of the cell of a fourth color screen is arranged between the center dots of two mutually adjacent cells of the second color screen.

17. The computer-readable storage medium as claimed in claim 11, wherein said second procedure causes the computer to rotate or turn the cells of the screens of the certain colors relative to the cells of the screen of the reference color.

18. The computer-readable storage medium as claimed in claim 17, wherein each of the cells has a non-regular hexagonal shape with two mutually confronting right-angled corners.

19. The computer-readable storage medium as claimed in claim 17, wherein the reference color is black or magenta.

20. The computer-readable storage medium as claimed in claim 11, wherein said program further comprises:
a third procedure which causes the computer to detect whether an input image is a photograph or characters,
said second procedure causing the computer to shift the cells of the screens of the certain colors relative to the cells of the screen of the reference color when said third procedure detects the characters by applying a scattered dot image, and rotate or turn the cells of the screens of the certain colors relative to the cells of the screen of the reference color when said third procedure detects the photograph by applying a clustered dot image.

* * * * *